United States Patent
Harris et al.

(10) Patent No.: US 8,413,153 B2
(45) Date of Patent: Apr. 2, 2013

(54) METHODS AND SYSTEMS FOR SHARING COMMON JOB INFORMATION

(75) Inventors: Anne C. Harris, Chandler, AZ (US); Timothy G. Boland, Phoenix, AZ (US); Steven D. Millman, Gilbert, AZ (US)

(73) Assignee: Freescale Semiconductor Inc., Austin, TX (US)

( * ) Notice: Subject to any disclaimer, the term of this patent is extended or adjusted under 35 U.S.C. 154(b) by 530 days.

(21) Appl. No.: 12/483,501

(22) Filed: Jun. 12, 2009

(65) Prior Publication Data

US 2010/0318996 A1 Dec. 16, 2010

(51) Int. Cl.
G06F 9/46 (2006.01)

(52) U.S. Cl. ......... 718/102; 718/100; 718/104; 718/106

(58) Field of Classification Search .......... 718/100, 718/102, 104, 106
See application file for complete search history.

(56) References Cited

U.S. PATENT DOCUMENTS

| | | | | |
|---|---|---|---|---|
| 5,414,845 | A * | 5/1995 | Behm et al. | 718/104 |
| 5,826,081 | A * | 10/1998 | Zolnowsky | 718/103 |
| 5,835,765 | A * | 11/1998 | Matsumoto | 718/102 |
| 5,978,830 | A * | 11/1999 | Nakaya et al. | 718/102 |
| 5,999,965 | A * | 12/1999 | Kelly | 709/202 |
| 6,769,125 | B2 * | 7/2004 | Menges et al. | 719/317 |
| 6,938,252 | B2 * | 8/2005 | Baylor et al. | 718/102 |
| 7,073,174 | B2 * | 7/2006 | Volkoff et al. | 718/102 |
| 7,316,017 | B1 * | 1/2008 | Jacobson et al. | 718/102 |
| 7,380,038 | B2 | 5/2008 | Gray | |
| 7,500,098 | B2 | 3/2009 | Paatero | |
| 7,644,408 | B2 * | 1/2010 | Kroening | 718/102 |
| 7,810,094 | B1 * | 10/2010 | McClure et al. | 718/102 |
| 7,836,448 | B1 * | 11/2010 | Farizon et al. | 718/100 |
| 2002/0116248 | A1 * | 8/2002 | Amit et al. | 705/9 |
| 2004/0160446 | A1 * | 8/2004 | Gosalia et al. | 345/503 |
| 2005/0033889 | A1 * | 2/2005 | Hass et al. | 710/260 |

OTHER PUBLICATIONS

Jones et al.,The Impact of Information Availability and Workload Characteristics on the Performance of Job Co-allocation in Multi-clusters, 2006, IEEE, ICPADS'06, pp. 1-10.*
Wei et al., Contract Net based Scheduling Approach using Interactive Bidding for Dynamic Job Shop Scheduling, 2007, IEEE, pp. 1-6.*

* cited by examiner

*Primary Examiner* — Meng An
*Assistant Examiner* — Abu Z Ghaffari
(74) *Attorney, Agent, or Firm* — Ingrassia Fisher & Lorenz, P.C.

(57) ABSTRACT

Apparatus and methods are provided for utilizing a plurality of processing units. A method comprises selecting a pending job from a plurality of unassigned jobs based on a plurality of assigned jobs for the plurality of processing units and assigning the pending job to a first processing unit. Each assigned job is associated with a respective processing unit, wherein the pending job is associated with a first segment of information that corresponds to a second segment of information for a first assigned job. The method further comprises obtaining the second segment of information that corresponds to the first segment of information from the respective processing unit associated with the first assigned job, resulting in an obtained segment of information and performing, by the first processing unit, the pending job based at least in part on the obtained segment of information.

21 Claims, 5 Drawing Sheets

METHODS AND SYSTEMS FOR SHARING COMMON JOB INFORMATION

TECHNICAL FIELD

Embodiments of the subject matter described herein relate generally to electrical systems, and more particularly, embodiments of the subject matter relate to hardware accelerators configured to share common job information among jobs.

BACKGROUND

In many networking applications, a variety of different types of ancillary information such as, for example, keys (e.g., for authentication and/or encryption/decryption), initializations (e.g., initialization vectors), protocol information, and other metadata, is often needed to process the data being transmitted. For example, encrypting data may require the appropriate cryptographic key, initializations and protocol information in addition to the payload data (or content) being encrypted and transmitted. Often, the data processing operations are offloaded from the main processing architecture to specialized hardware configured to perform the various data processing operations.

In many situations, the ancillary information needed when processing the data can approach the size of the information (or content) being transmitted, particularly when the data processing is being performed on data with high granularity (e.g., on relatively small data packets or frames). Often, the hardware accelerator used to perform the data processing operations does not include a cache and/or sufficient memory to maintain the recently utilized job information, and thus, the hardware accelerator must repeatedly obtain the ancillary information for each job from an external location (e.g., the main system memory) over the system bus on a job-by-job basis. Thus, the available bandwidth on the system bus is reduced, particularly as the size of the ancillary information increases, thereby hindering performance of the overall system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
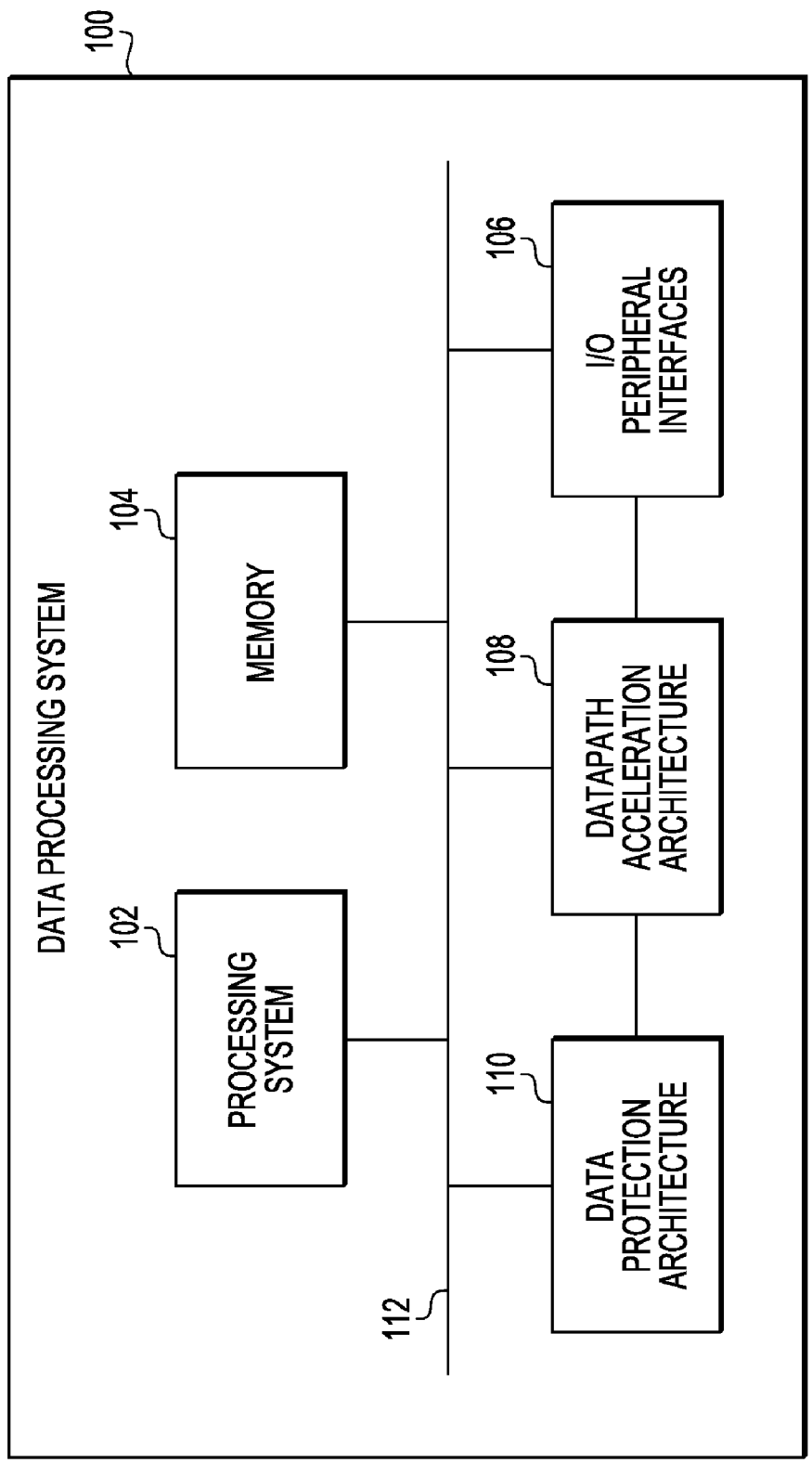
FIG. 1 is a block diagram of a data processing system in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to computer architecture, hardware acceleration, data processing, data formatting, memory operations, instruction set programming and/or other low-level programming, cryptography, authentication, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by software code representation thereof.

Technologies and concepts discussed herein relate to systems and methods for sharing common job information among processing units within a hardware accelerator in lieu of obtaining the common job information from an external source (e.g., accessing system memory). Jobs are assigned to processing units in a manner that reduces the number of memory accesses and/or data transfers, which avoids the latency and reduction of available bandwidth on the system bus associated with memory operations. Although the subject matter is described herein in the context of data protection architecture in a networking application, the subject matter described herein is not intended to be limited to any particular implementation.

FIG. 1 depicts an exemplary embodiment of a data processing system 100 suitable for use in a networking device, such as, for example, a router, switch, bridge, server, or another suitable network infrastructure component. In an exemplary embodiment, the data processing system 100 includes, without limitation, a processing system 102, a memory 104, one or more input/output (I/O) peripherals 106, a datapath acceleration architecture (DPAA) 108, and a data protection architecture 110. As described in greater detail below, in an exemplary embodiment, the DPAA 108 comprises a hardware accelerator configured to offload networking-related functions from the processing system 102 and the data protection architecture 110 comprises a hardware accelerator (or alternatively, a hardware acceleration architecture) configured to offload security-related functions from the processing system 102. In an exemplary embodiment, the elements of the data processing system 100 are communicatively coupled to the remaining elements of the data processing system 100 over a parallel bus interface 112, although in practice, another suitably configured bus, shared interface, or another interconnection arrangement may be used.

In an exemplary embodiment, the data processing system 100 is realized as a system-on-a-chip (SOC). In this regard, the processing system 102, memory 104, I/O peripherals 106, DPAA 108, and data protection architecture 110 may be integrally formed into a single integrated circuit, as will be appreciated in the art. It should be understood that FIG. 1 is a simplified representation of a data processing system 100 for purposes of representation and ease of explanation and is not intended to limit the subject matter described herein in any way. In this regard, in alternative embodiments, the processing system 102, memory 104, I/O peripherals 106, DPAA 108, and data protection architecture 110 may each be realized as a separate integrated circuit. It will be appreciated that practical embodiments of the data processing system 100 may include additional components and/or elements configured to perform additional functionality not described herein.

The processing system 102 generally represents the main processing core(s) or central processing unit(s) (CPU) for the data processing system 100. In this regard, the processing system 102 executes applications and/or programs for the data processing system 100, accesses (e.g., reads from and/or writes to) memory 104, and interacts with other elements of the data processing system 100 in a conventional manner, as will be appreciated in the art. In an exemplary embodiment, the processing system 102 is implemented or realized as a plurality of microprocessor cores, however, in alternative embodiments, the processing system 102 may be realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. The memory 104 is suitably configured to support operations of the processing system 102 as well as other components of the data processing system 100 as will be appreciated in the art. In this regard, memory 104 functions as the main memory or primary memory for the data processing system 100. Depending on the embodiment, memory 104 may be realized as RAM memory, ROM memory, flash memory, registers, a hard disk, or another suitable storage medium known in the art or any suitable combination thereof.

The I/O peripherals 106 represent the hardware, software, and/or firmware components configured to support communications (e.g., input from and output to) between the data processing system 100 and one or more peripheral (or external) devices. In an exemplary embodiment, the I/O peripherals 106 include at least one communications interface (e.g., an Ethernet interface) configured to support data transmission to/from the data processing system 100 and other devices over a network (e.g., a local area network, a wireless network, or the like) in accordance with one or more data communication protocols, such as, for example, conventional Internet Protocol techniques, TCP/IP, hypertext transfer protocol (HTTP), IEEE 802.11 (any variation), IEEE 802.16 (WiMAX or any other variation), or another comparable protocol. In addition, the I/O peripherals 106 may include other peripheral interfaces, such as, for example, Peripheral Component Interconnect (PCI) interfaces, RapidIO interfaces, Universal Serial Bus (USB) interfaces, and the like.

In an exemplary embodiment, the DPAA 108 represents the hardware and/or firmware components configured to support hardware acceleration for various networking-related functions, such as, for example, packet parsing, classification, distribution, scheduling, sequencing, buffer allocation and/or de-allocation, congestion management, and the like. In this regard, in an exemplary embodiment, the DPAA 108 is coupled to the I/O peripheral 106 (e.g., the Ethernet interface) to offload lower-level packet processing from the processing system 102, thereby reducing the instructions per packet performed by the processing system 102 and enabling the processing system 102 to dedicate more time and/or resources to other operations (e.g., the applications and/or operating system being executed by the processing system 102).

The data protection architecture 110 represents the hardware and/or firmware components configured to support hardware acceleration for various data protection functions, such as, for example, cryptographic algorithms and/or integrity checking, as described in greater detail below. In this regard, in an exemplary embodiment, the data protection architecture 110 is coupled to the DPAA 108 to offload packet-level data protection from the processing system 102 and/or DPAA 108. Depending on the embodiment, the data protection architecture 110 may be configured to support data protection functions for one or more security protocols, such as, for example, internet protocol security (IPsec), transport layer security (TLS) and/or secure sockets layer (SSL), secure real-time transport protocol (SRTP), the IEEE 802.1AE MAC security standard (MACsec), the IEEE 802.16e WiMax MAC layer, third generation radio link control (3GPP RLC), or another suitable protocol.

As described in greater detail below, in an exemplary embodiment, the processing system 102 and/or DPAA 108 are potential job sources for the data protection architecture 110 that provide data protection jobs to the data protection architecture 110 for subsequent execution. As used herein, a data protection job (alternatively referred to herein as simply "job") should be understood as comprising one or more operations, tasks, processes and/or procedures which is performed and/or executed by the data protection architecture 110. In an exemplary embodiment, each job includes or is otherwise associated with job information residing in the main system memory 104. In this regard, the job information for a job comprises the various commands, metadata, payload data, and/or other information needed by the data protection architecture 110 to perform and/or execute the one or more operations, tasks, processes and/or procedures that comprise the respective job. In an exemplary embodiment, the each job comprises at least a job descriptor segment, and depending upon the particular job, the respective job may also comprise a shared descriptor segment. As described in greater detail below, the shared descriptor segment comprises job information (e.g., cryptographic keys, initializations, protocol information, metadata, commands, or other information) that is common to more than one job and includes sharing criteria for determining whether and/or how the common job information may be shared among jobs. The job descriptor comprises job information (e.g., commands, payload data, or other information) that is unique to the particular job and is not shared among other jobs.

In an exemplary embodiment, the data protection architecture 110 manages jobs in a manner that shares common job information (e.g., shared descriptor segments) among jobs to reduce and/or minimize redundantly accessing memory 104 to obtain shared descriptor segments already obtained from memory 104 and available within the data protection architecture 110, as described in greater detail below. In this regard, the data protection architecture 110 obtains a plurality of jobs from job sources (e.g., the processing system 102 and/or DPAA 108), obtains job information for at least some of the jobs from memory 104, and performs jobs based on the obtained job information. As described in greater detail below, when a segment of information for a job of the plurality of jobs corresponds to or matches a subset of obtained job information for another job, the data protection architecture 110 performs the job based at least in part on the subset of the obtained job information for the other job in lieu of accessing memory 104 for the common job information already maintained by the data protection architecture 110.

Figure 2:
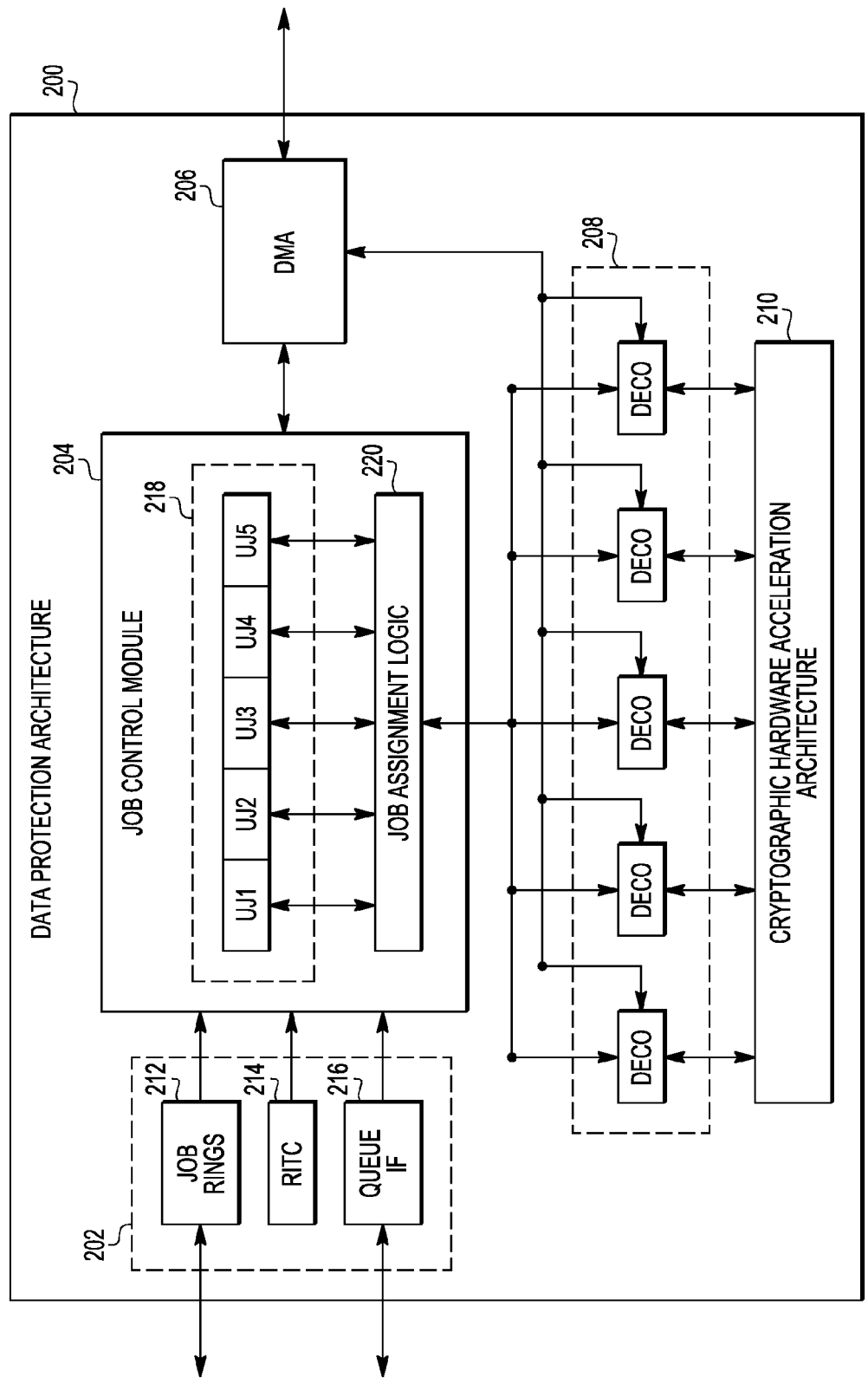
FIG. 2 is a block diagram of a data protection architecture suitable for use in the data processing system of FIG. 1 in accordance with one embodiment of the invention.

FIG. 2 depicts an exemplary embodiment of a data protection architecture 200 suitable for use as the data protection architecture 110 in the data processing system 100 of FIG. 1. In an exemplary embodiment, the data protection architecture 200 includes, without limitation, one or more job sources 202, a job control module 204, a memory access module 206, a plurality of processing units 208, and a cryptographic hardware acceleration architecture 210. It should be appreciated that FIG. 2 is a simplified diagram of the data protection architecture 200 for purposes of explanation, and FIG. 2 is not intended to limit the scope of the subject matter in anyway. In this regard, the data protection architecture 200 may include additional components suitably configured to support operation of the data protection architecture 200, as described in greater detail below.

In an exemplary embodiment, the one or more job sources 202 are configured to generate and/or obtain data protection jobs to be performed and/or executed by the data protection architecture 200. The job control module 204 is coupled to the job sources 202, the memory access module 206, and the processing units 208. The memory access module 206 is preferably realized as a direct memory access (DMA) engine configured to read information from and/or write information to external memory (e.g., memory 104), that is, storage medium external to the data protection architecture 200 and coupled to the data protection architecture 200 (e.g., via bus 112). As described in greater detail below, the memory access module 206 is configured to obtain job information (e.g., commands, metadata, payload data, and/or other information) from external memory and provide the job information to the job control module 204 and/or processing units 208 for executing the particular jobs assigned to the processing units 208. In this manner, the job control module 204 and processing units 208 are communicatively coupled to external memory (e.g., memory 104) via the memory access module 206.

In an exemplary embodiment, each processing unit 208 is realized as a specialized processing unit (alternatively referred to herein as a descriptor controller or DECO) configured to perform data protection jobs in conjunction with the cryptographic hardware acceleration architecture 210. The cryptographic hardware acceleration architecture 210 generally represents the hardware and/or firmware configured to perform and/or execute cryptographic operations in conjunction with the DECOs 208. In an exemplary embodiment, the cryptographic hardware acceleration architecture 210 comprises one or more specialized cryptographic hardware accelerators (CHAs), such as, for example, an advanced encryption standard (AES) unit, a cyclic redundancy check accelerator, a data encryption standard (DES) execution unit, a KASUMI execution unit, a SNOW hardware accelerator, a message digest execution unit, a public key execution unit, a random number generator, and the like. In addition, the cryptographic hardware acceleration architecture 210 may include buffers, FIFOs, and other elements configured to support operation of the cryptographic hardware acceleration architecture 210. The DECOs 208 are coupled to the memory access module 206 and the cryptographic hardware acceleration architecture 210, and the memory access module 206, DECOs 208, and cryptographic hardware acceleration architecture 210 are cooperatively configured to execute or otherwise perform the particular job assigned to the respective DECO 208. In an exemplary embodiment, the job control module 204 is configured to assign jobs or otherwise manage the flow of jobs from the job sources 202 to the DECOs 208 in a manner that allows common job information already residing in the DECOs 208 to be shared among the DECOs 208 in lieu of redundantly accessing external memory, as described in greater detail below.

In an exemplary embodiment, the job sources 202 comprise a job ring 212, a real-time integrity checker (RTIC) 214, and a queue interface 216. The job ring 212 comprises a circular buffer (or ring buffer) that includes a plurality of jobs which are obtained and/or loaded into the job ring 212 from an external job source via an interface coupled to the data protection architecture 200 (e.g., from the processing system 102 via interface 112). The job ring 212 includes, for each job maintained by the job ring 212, a pointer (or address) for the location of the respective job in external memory (e.g., memory 104). In this regard, in an exemplary embodiment, each job is preferably configured in memory (e.g., memory 104) with a job header comprising control information for the respective job, such as, for example, information regarding the job descriptor segment and/or shared descriptor segment for the particular job. In this regard, the job ring 212 preferably includes a pointer (or address) for the location, in memory (e.g., memory 104), of the job header for each respective job maintained by the job ring 212. The RTIC 214 is configured to generate jobs during operation of the data protection architecture 200 and maintains a pointer (or address) for the location of the job header for the generated job. In an exemplary embodiment, the queue interface 216 obtains and/or provides pointers (or addresses) for the location of the job headers in external memory (e.g., memory 104) for jobs generated by an external source (e.g., from the DPAA 108).

In an exemplary embodiment, the job control module 204 obtains jobs from the job sources 202 to create an unassigned job pool, as described in greater detail below. In an exemplary embodiment, the job control module 204 obtains the pointers (or addresses) for the various jobs from the job sources 202 and obtains a burst of the job information for the respective jobs either directly from the job source 202 or from the external memory (e.g., memory 104) via the memory access module 206 based on the pointers (or addresses) for the respective jobs. In this regard, the burst of job information is a subset of job information for the particular job. For example, the entire amount of job information for a job may comprise 64 32-bit words of data in memory while the burst of job information may comprise about 16 32-bit words of data, or in other words, approximately one fourth of the total amount of job information. The burst of the job information comprises a sufficient amount of data such that it includes at least the job header and the shared descriptor pointer for the respective job. In this regard, each job may be arranged in memory with the job header being followed by the shared descriptor pointer (if the job has a shared descriptor segment) followed by the job descriptor segment. The shared descriptor pointer corresponds to the location (or address) in external memory where the shared descriptor segment for the particular job resides. In this regard, in accordance with one or more embodiments, the burst of information comprises a sufficient amount of data to include at least the job header and the shared descriptor pointer for a respective job.

The job control module 204 preferably includes or otherwise accesses a plurality of registers 218 that are utilized to store or otherwise maintain the bursts of job information for a plurality of unassigned jobs until one or more unassigned jobs is assigned to a DECO 208. In this regard, the registers 218 function as a holding pool or holding tank for unassigned jobs to be subsequently assigned to and/or executed by the DECOs 208. It should be noted that although FIG. 2 depicts a data protection architecture 200 with the number of registers 218 being equal to the number of DECOs 208, in practice, any number of registers 218 may be used with any number of DECOs 208 for a given application. The job control module 204 also includes job assignment logic 220 configured to assign jobs from the registers 218 to the DECOs 208 based on common information across jobs (e.g., the shared descriptors), as described in greater detail below.

In an exemplary embodiment, each DECO 208 is configured to perform and/or execute an assigned job based on the commands, metadata (e.g., cryptographic keys, initializations, protocol information, payload data, and/or other job information associated with the job. In accordance with one or more embodiments, the DECOs 208 have limited program memory and do not include or otherwise have access to a local cache or similar memory element within the data protection architecture 200. In an exemplary embodiment, the memory of each DECO 208 is limited to a job buffer of 64 32-bit words configured to store or otherwise maintain the job information for a job associated with and/or assigned to the respective DECO 208, as described in greater detail below. For example, if the job information comprises 64 32-bit words of data, the job buffer of each DECO 208 is configured to store 64 32-bit words of data. As described in greater detail below, if at least some of the job information for a job newly assigned to a DECO 208 is already maintained by the data protection architecture 200 (e.g., by the job control module 204 and/or DECOs 208), the DECOs 208 are configured to obtain that portion of job information from within the data protection architecture 200 (e.g., from the job control module 204 and/or DECOs 208) rather than accessing external memory. In this regard, the DECOs 208 and memory access module 206 are cooperatively configured to obtain job information that is not already available within the data protection architecture 200 from external memory and store the job information in the job buffer of the respective DECO 208 associated with the particular job.

Figure 3:
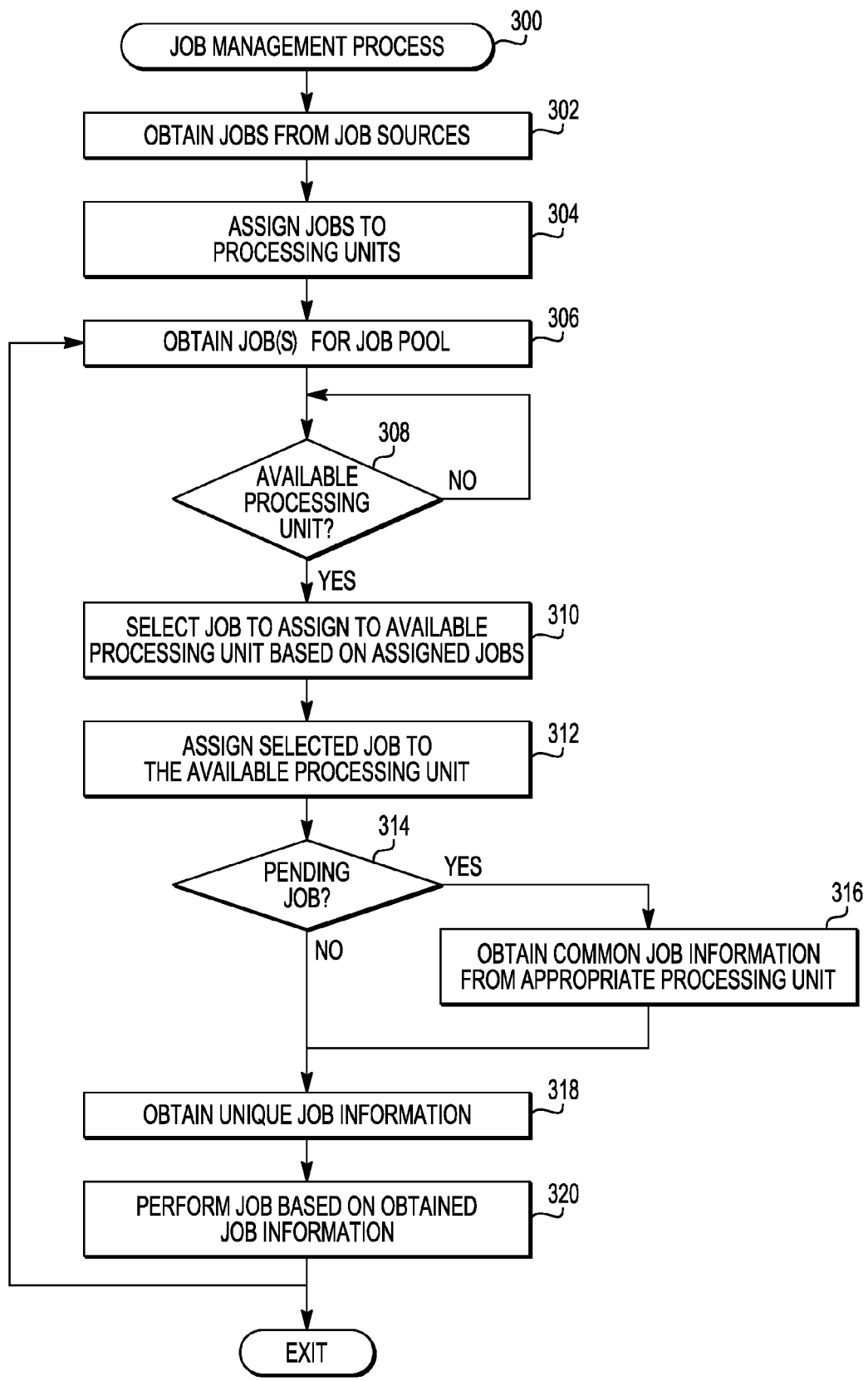
FIG. 3 is a flow diagram of a job management process suitable for used with the data protection architecture of FIG. 2 in accordance with one embodiment of the invention.

Referring now to FIG. 3, in an exemplary embodiment, a networking module may be configured to perform a job management process 300 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the processing system 102, memory 104, the DPAA 108, data protection architecture 110, 200, the bus 112, the job sources 202, the job control module 204, the memory access module 206, and/or the DECOs 208. It should be appreciated that any number of additional or alternative tasks may be included, and may be incorporated into a more comprehensive procedure or process having additional functionality not described in detail herein. Furthermore, it should be noted that although FIG. 3 depicts the job management process 300 in a serial manner, in practical implementations, the job management process 300 may be implemented in parallel, i.e., one or more of the various tasks and/or operations that comprise the job management process 300 may be concurrently and/or simultaneously performed.

Referring to FIG. 3, and with continued reference to FIG. 1 and FIG. 2, a job management process 300 may be performed to control and/or manage the performance of jobs by a hardware accelerator (e.g., data protection architecture 110, 200) to reduce the amount of data (size and/or number of operations) obtained from an external source (e.g., memory 104) and thereby improve bandwidth availability on a system bus (e.g., bus interface 112) between the hardware accelerator and the external source. In an exemplary embodiment, the job management process 300 initializes or begins by obtaining jobs from one or more job sources and assigning jobs among a plurality of processing units (tasks 302, 304). In this regard, the job control module 204 may obtain jobs from the job sources 202 and assign a job to each of the DECOs 208. Depending on the embodiment, the job control module 204 obtains the jobs from the job sources 202 in the order that they are generated and/or obtained by the job sources 202 (e.g., sequentially), in a round-robin manner (e.g., first from job ring 212, then from RTIC 214, then from queue interface 216, and repeating), or in another suitable manner known in the art. As set forth above, the job control module 204 obtains a burst of job information for an obtained job (either from the respective job source 202 and/or memory) and assigns the job by providing the burst of job information to a particular DECO 208 being assigned the job.

Figure 4:
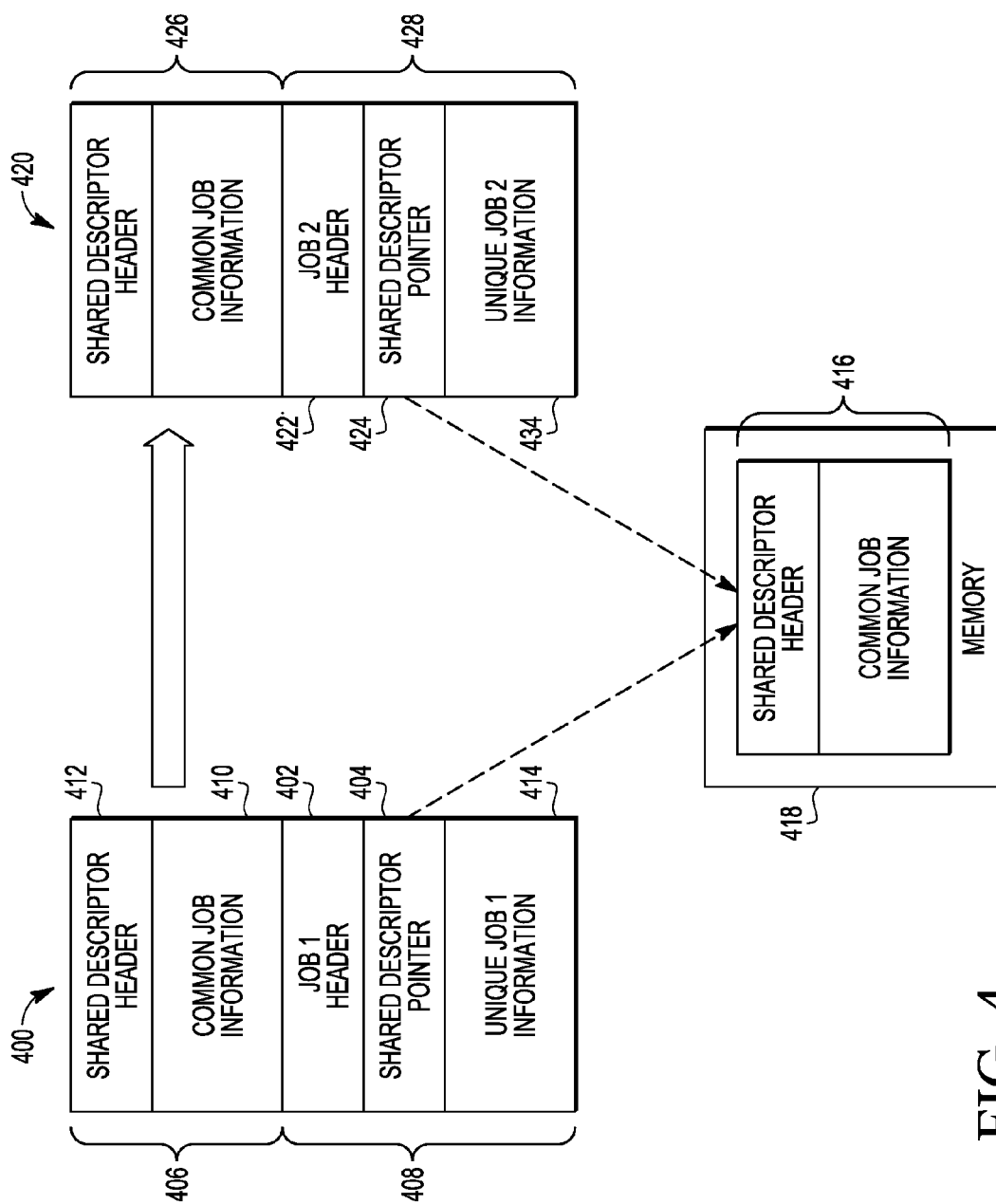
FIG. 4 is a diagram that illustrates job buffers and the relationship between common job information and memory in accordance with one embodiment of the invention.

In an exemplary embodiment, each DECO 208 processes the burst of job information and obtains any additional job information for the particular job from memory. For example, FIG. 4 depicts an exemplary embodiment of the contents of a job buffer 400 maintained by a first DECO after being assigned a first job from the job control module 204. The job control module 204 initially obtains a burst of job information that comprises at least the job header 402 and shared descriptor pointer 404 and provides the DECO with the burst of the job information for the first job. The DECO and memory access module 206 are cooperatively configured to obtain any additional job information not included in the initial burst of job information (e.g., based on the shared descriptor pointer 404 and/or control information in the job header 402) from memory 418, which the DECO then stores and/or maintains in its job buffer 400. In this regard, the shared descriptor pointer 404 points to the location of the shared descriptor segment 416 for the first job within memory 418. The DECO and memory access module 206 are cooperatively configured to obtain the shared descriptor segment 416 for the first job from external memory 418 (e.g., memory 104) based on the shared descriptor pointer 404 and store a copy of the shared descriptor segment 406 in the job buffer 400. The shared descriptor segment 406 includes shared descriptor information 410 (e.g., cryptographic keys, initializations, protocol information, metadata, commands, or other common job information) for the first job along with a shared descriptor header 412 which includes and/or indicates sharing criteria for the manner in which the shared descriptor segment 406 may be shared among other jobs assigned to the DECOs. In accordance with one or more embodiments, the burst of job information for the first job includes the job descriptor information 414 for the first job, that is, the unique job information for the first job that comprise the job descriptor segment 408.

If the burst of the job information does not include the entirety of the job descriptor information 414 (e.g., the job descriptor information 414 is larger than the burst of job information loaded into the register 218), then the DECO and memory access module 206 obtain any additional job descriptor commands 414 from memory 418 based on a job descriptor pointer in a similar manner as set forth above in regards to the shared descriptor segment. After the DECO has obtained all job information for the first job, the DECO processes the shared descriptor information 410 and job descriptor information 414 in its job buffer 400 and executes or otherwise performs the one or more operations that comprise the first job in conjunction with the cryptographic hardware acceleration architecture 210.

Referring again to FIG. 3, and with continued reference to FIG. 1, FIG. 2 and FIG. 4, the job management process 300 continues by obtaining additional jobs from the job sources to create a job pool containing unassigned jobs to be subsequently performed and/or executed by the processing units (task 306). In this regard, the job control module 204 obtains unassigned jobs from the job sources 202 and then obtains a burst of job information (e.g., at least the job header and shared descriptor pointer) for each unassigned job which is stored and/or maintained by a register 218. The job control module 204 preferably obtains unassigned jobs from the job sources 202 until each register 218 contains a burst of job information for an unassigned job. The job control module 204 may obtain unassigned jobs for the registers 218 from the job sources 202 in a similar manner as the jobs are initially obtained (e.g., by obtaining jobs from job sources 202 in a sequential manner, in a round-robin manner, or another suitable manner known in the art). Preferably, jobs are obtained for the job pool in a manner that avoids and/or mitigates starvation of any individual job source 202.

The job management process 300 continues by identifying an available processing unit of the plurality of processing units (task 308). In this regard, an available processing unit should be understood as a processing unit that is not associated with any job or has completed performing and/or executing its associated job (e.g., its previously assigned job). In an exemplary embodiment, each DECO 208 is configured to automatically indicate its status as available in response to completing a previously assigned job. In an exemplary embodiment, the job control module 204 may continuously monitor and/or periodically poll the DECOs 208 to determine and/or identify when one of the DECOs 208 becomes available. In response to identifying an available processing unit, the job management process 300 continues by selecting an unassigned job from the job pool to be assigned to the available processing unit (task 310). In an exemplary embodiment, the unassigned job is selected based on the plurality of jobs associated with and/or assigned to the plurality of processing units (e.g., the plurality of assigned jobs).

In an exemplary embodiment, the job control module 204 and/or job management process 300 performs a job selection process to select an unassigned job from the unassigned job pool for the available DECO based on sharing criteria (e.g., a share type and a sharing availability) for the jobs currently associated with the plurality of DECOs 208, as described in greater detail below in the context of FIG. 5. In this regard, in an exemplary embodiment, each DECO is configured to indicate to the job control module 204 the manner in which the shared descriptor segment (e.g., common job information) for its assigned job may be shared based on the sharing criteria for its assigned job. In accordance with one or more embodiments, each DECO processes the shared descriptor header (e.g., shared descriptor header 412) for its assigned job to identify a share type for its shared descriptor segment (e.g., shared descriptor segment 406), such as, for example, 'serial' or 'parallel.' In this regard, a share type of 'serial' indicates that the shared descriptor segment for a particular job may be shared serially among jobs assigned to the same DECO (e.g., from a previously assigned job for the DECO to a succeeding assigned job) while a share type of 'parallel' indicates that the shared descriptor segment for the particular job may be shared in parallel among jobs assigned to different DECOs. Each DECO is preferably configured to process the shared descriptor header for its assigned job and indicate the share type to the job control module 204.

In addition, in an exemplary embodiment, the shared descriptor header also includes sharing criteria for determining the availability of the shared descriptor segment (alternatively referred to as the sharing availability), that is, whether or not the shared descriptor segment may be validly shared among jobs. In this regard, each DECO processes the shared descriptor header for its assigned job and indicates the sharing availability for the shared descriptor segment maintained in its job buffer. In an exemplary embodiment, the sharing availability indicated by each DECO is a binary criterion (e.g., 'available' or 'unavailable'). Depending on the particular job, the sharing criteria in the shared descriptor header may dictate that the shared descriptor segment has an execution-dependent availability. In this regard, an execution-dependent sharing availability corresponds to a shared descriptor segment that is available for sharing based upon the stage of execution of its respective job. For example, the shared descriptor segment may only be available for sharing before and/or after a certain stage of execution of is associated job, in which case, the DECO indicates a sharing availability of 'available' for some stages of execution of its assigned job and a sharing availability of 'unavailable' during other stages of execution of its assigned job. For other jobs, the sharing criteria in the shared descriptor header may dictate that the shared descriptor segment always be available for sharing, or alternatively, always be unavailable for sharing. In the case of a job having no shared descriptors, a DECO may indicate a sharing availability of 'unavailable.'

After selecting an unassigned job for the available processing unit, the job management process 300 continues by assigning the selected job to the available processing unit (task 312). In this regard, the job control module 204 transfers or otherwise provides the burst of job information (e.g., at least the job header and shared descriptor pointer) for the selected job from the appropriate register 218 to the available DECO 208. In an exemplary embodiment, the job management process 300 continues by determining whether the selected job (or alternatively, the newly assigned job) is a pending job (tasks 314). As described in greater detail below, a pending job should be understood as referring to a job that is associated with or otherwise includes a shared descriptor segment that corresponds to the shared descriptor segment for another job that has been previously assigned to or is currently associated with at least one of the processing units, and the respective processing unit associated with the previously assigned job indicates that its shared descriptor segment is available for sharing. In this regard, a pending job is associated with a shared descriptor segment that matches or is otherwise identical to a shared descriptor segment for a previously assigned job that has already been read and/or copied from memory and is currently being maintained by at least one of the processing units. In other words, a pending job has a shared descriptor segment that corresponds to a subset of the previously obtained job information for another job that is currently being maintained in a job buffer of one of the DECOs. In an exemplary embodiment, the job control module 204 determines the selected job is a pending job by comparing the shared descriptor pointer for the selected job to the shared descriptor pointers and sharing criteria of the jobs previously assigned to the DECOs 208.

In response to determining the selected job is a pending job, the job management process 300 continues by obtaining the shared descriptor segment for the selected job from the appropriate processing unit (task 316). In this regard, when assigning the selected job to the available DECO, the job control module 204 notifies the available DECO that the selected job is a pending job and identifies the appropriate DECO having the shared descriptor information that corresponds to the selected job. In exemplary embodiment, the available DECO obtains the shared descriptor segment for its newly assigned job (the selected job) by obtaining the shared descriptor segment from the appropriate DECO in lieu of accessing and/or obtaining the shared descriptor segment from external memory. It should be noted that in some embodiments, the appropriate DECO having the shared descriptor segment may correspond to the available DECO (e.g., in the case of serial sharing), in which case the shared descriptor segment from the job previously associated with the available DECO is maintained such that it remains unchanged in the job buffer of the available DECO.

For example, referring again to FIG. 4, the job control module 204 may obtain a burst of job information (e.g., job header 422 and shared descriptor pointer 424) for a second job and maintain the burst of job information in a register of the plurality of registers 218 (e.g., task 306). As shown, the shared descriptor pointer 424 for the second job corresponds to the same location in memory 418 as the shared descriptor pointer 404 for the first job that has already been assigned, or in other words, the shared descriptor segment 426 for the second job is the same as the shared descriptor segment 406 for the first job which has been previously obtained from memory 418 and is currently maintained in the job buffer 400 of one of the DECOs. Thus, the second job is a pending job when the shared descriptor segment 406 for the first job is available for sharing. In response to identifying a DECO as being available, the job control module 204 may select the second job by performing a job selection process (e.g., job selection process 500) and assign the second job to the available DECO (e.g., tasks 308, 310, 312).

In an exemplary embodiment, the job control module 204 determines that the selected job is a pending job by determining that the shared descriptor pointer 424 for the second job matches the shared descriptor pointer 404 for the first job and by determining that the shared descriptor segment 406 for the first job is available for sharing (e.g., task 314). When the job control module 204 assigns the selected job to the available DECO, the job control module 204 notifies the available DECO that the second job is a pending job and provides the available DECO with the identity of the job buffer 400 and/or DECO having the shared descriptor segment 416 that corresponds to the selected job. The available DECO obtains the subset of the job information for the first job corresponding to the shared descriptor pointer 424 (e.g., shared descriptor segment 406) from the appropriate job buffer 400 (e.g., task 316). In this regard, in the case of parallel sharing, the available DECO copies the subset of the job information for the first job corresponding to the shared descriptor segment 406 from the first job buffer 400 and stores the copy of the shared descriptor segment 426 in its job buffer 420. In the case of serial sharing among jobs assigned to the same DECO, the available DECO maintains the subset of the job information for the first job corresponding to the shared descriptor segment in its job buffer. In other words, in the case of serial sharing, job buffer 420 represents the updated contents of the job buffer 400 after the second job is assigned to the available DECO, in which case, the shared descriptor segment 406 is maintained and remains unchanged in the job buffer for the available DECO. In this manner, the available DECO obtains the shared descriptor segment 416 corresponding to the shared descriptor pointer 424 for the second job without accessing external memory 418. The available DECO stores the burst of job information for the second job (e.g., at least job header 422 and shared descriptor pointer 424) in its job buffer 420.

Referring again to FIG. 3 with continued reference to FIGS. 1-2 and FIG. 4, in an exemplary embodiment, the job management process 300 continues by obtaining any additional job information for the selected job from memory (task 318). In this regard, the DECO processes the job header 422 of the selected job and obtains any additional job descriptor information 434 (e.g., unique commands and/or other job information for the selected job) from memory 418 (e.g., memory 104 via the memory access module 206) that were not included in the burst of job information for the selected job and stores the job descriptor information 434 in its job buffer 420. In this regard, if the selected job is not a pending job, then the DECO processes the job header of the selected job and obtains job information for the selected job that is not included in the burst of job information obtained by the job control module 204.

After the obtaining all job information for the selected job, the job management process 300 continues by performing or otherwise executing the selected job (task 320). In this regard, the DECO performs or otherwise executes the selected job (which is now its assigned job) based on the job information associated with the selected job (e.g., its shared descriptors and/or job descriptors) in a conventional manner. In an exemplary embodiment, the loop defined by tasks 306, 308, 310, 312, 314, 316, 318 and 320 may repeat as desired throughout operation of the data protection architecture 200. In this regard, in an exemplary embodiment, job management process 300 obtains new unassigned jobs for the job pool such that the registers 218 are fully utilized (e.g., task 306), and in response to completing performance of its assigned job, each DECO 208 is configured to identify itself as available to the job control module 204 (e.g., task 308) and is subsequently assigned a new job to perform and/or execute (e.g., tasks 310, 312, 314, 316, 318, 320).

Figure 5:
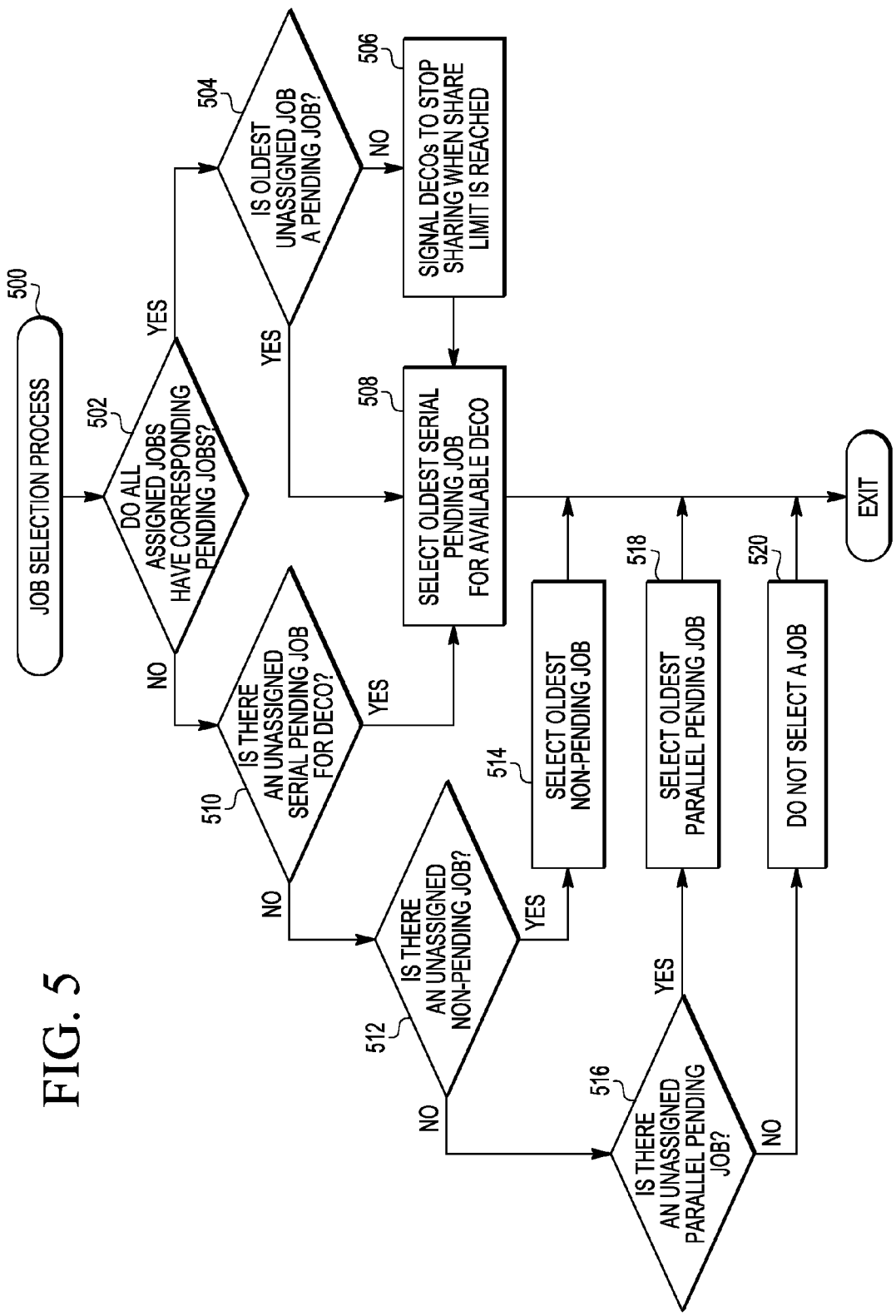
FIG. 5 is a flow diagram of a job selection process suitable for use with the job management process of FIG. 3 in accordance with one embodiment of the invention.

Referring now to FIG. 5, in an exemplary embodiment, a data protection architecture in a networking module may be configured to perform a job selection process 500 and additional tasks, functions, and operations described below. The various tasks may be performed by software, hardware, firmware, or any combination thereof. For illustrative purposes, the following description may refer to elements mentioned above in connection with FIGS. 1-4. In practice, the tasks, functions, and operations may be performed by different elements of the described system, such as the job control module 204, the job assignment logic 220 and/or the DECOs 208. It should be appreciated that any number of additional or alternative tasks may be included, and may be incorporated into a more comprehensive procedure or process having additional functionality not described in detail herein.

Referring to FIG. 5, and with continued reference to FIGS. 1-4, a job selection process 500 may be performed to select an unassigned job from a plurality of unassigned jobs (alternatively referred to as "unassigned job pool" or simply "job pool") to be assigned to an available processing unit (e.g., tasks 308, 310). In an exemplary embodiment, the job selection process 500 begins by determining whether each processing unit is associated with and/or assigned a job and the job pool includes at least one pending job corresponding to each job currently assigned and/or associated with a processing unit (task 502). In this regard, the job control module 204 and/or job assignment logic 220 compares the shared descriptor pointers for the unassigned jobs in the registers 218 to the shared descriptor pointers and sharing availability for the plurality of jobs currently assigned to and/or associated with the DECOs 208 (including the job recently completed by the available DECO) to determine whether a pending job exists for each assigned job. In other words, the job control module 204 and/or job assignment logic 220 determines that the job pool includes a pending job corresponding to each of the assigned jobs when each assigned job is available for sharing and has a shared descriptor pointer that matches a shared descriptor pointer of at least one unassigned job in the job pool.

In an exemplary embodiment, if the job selection process 500 determines that all processing units are associated with and/or assigned a job and there is at least one pending job in the job pool corresponding to each assigned job, the job selection process 500 continues by determining whether the oldest unassigned job in the job pool is a pending job (task 504). The oldest unassigned job is the unassigned job in the job pool that has been in the job pool for the longest period of time (e.g., the longest elapsed time since being obtained from a respective job source 202). In this regard, the job control module 204 and/or job assignment logic 220 maintains a timestamp (or other suitable aging information) for the unassigned jobs such that the oldest unassigned job may be identified. If the oldest unassigned job is not a pending job, the job selection process 500 continues by instructing the processing units to stop sharing when a share limit is reached (task 506). The share limit represents a reasonable number of pending jobs the processing units are allowed to obtain and/or execute successively. Once a processing unit reaches the share limit, the processing unit is preferably configured to override the sharing criteria for its assigned job and indicate a sharing availability of 'unavailable.' The share limit ensures that an unassigned non-pending job will be eventually assigned, as described in greater detail below. In an exemplary embodiment, each DECO 208 includes a counter configured to increment each time the DECO 208 is assigned a pending job. When the oldest unassigned job is not a pending job, the job control module 204 initiates and/or resets the counters in the DECOs 208 and configures the DECOs 208 to stop sharing when the share limit is reached. Once the counter in a DECO reaches the share limit, the DECO automatically sets its sharing availability to 'unavailable,' thereby overriding the sharing criteria for the job assigned to the DECO.

In an exemplary embodiment, the job selection process 500 continues by selecting the oldest unassigned serial pending job for the available processing unit (task 508). An unassigned serial pending job comprises an unassigned pending job having a shared descriptor segment (or shared descriptor pointer) that matches the shared descriptor segment (or shared descriptor pointer) of the job previously assigned to (or recently completed by) the available processing unit. In addition, the sharing criteria for the job previously assigned to the available DECO must indicate that the shared descriptor segment is available for serial sharing. When the sharing criteria for the job previously assigned to the available DECO indicates it is available for serial sharing, the job control module 204 and/or job assignment logic 220 selects the oldest unassigned job from the plurality of registers 218 having a shared descriptor pointer that matches the shared descriptor pointer for the job previously associated with the available DECO 208. After the oldest unassigned serial pending job is selected, the job selection process 500 exits and the selected job is assigned to the available DECO 208 as set forth above (e.g., task 312). Because the selected job is a serial pending job having the same shared descriptor pointer as the job previously assigned to the available DECO, the shared descriptor segment for the selected job already resides in the job buffer of the available DECO (e.g., tasks 314, 316). In this case, the shared descriptor segment for the selected job is maintained and remains unchanged in the job buffer of the available DECO. In this manner, the shared descriptor information (e.g., the shared descriptors and shared descriptor header) is shared serially from the previously assigned job to the newly assigned job.

In an exemplary embodiment, when the job selection process 500 determines there is not at least one pending job in the job pool corresponding to each of the currently assigned jobs, the job selection process 500 continues by determining whether there is an unassigned serial pending job for the available processing unit (task 510). As set forth above, the job control module 204 and/or job assignment logic 220 compares the shared descriptor pointers for the unassigned jobs in the registers 218 to the shared descriptor pointer and sharing availability for the job previously assigned to the available DECO. If one or more unassigned jobs have a shared descriptor pointer matching the shared descriptor pointer for the job previously assigned to the DECO and the previously assigned job is available for sharing, the job selection process 500 continues by assigning the oldest unassigned serial pending job corresponding to the available DECO (task 508). As set forth above, the selected job is assigned to the available DECO, and in response to assigning the serial pending job to the available DECO, the shared descriptor segment for the selected job is maintained in the job buffer of the available DECO (e.g., tasks 312, 314, 316).

In an exemplary embodiment, when the job selection process 500 determines that there are no unassigned serial pending jobs for the available processing unit in the job pool, the job selection process 500 continues by identifying and/or determining whether there are any unassigned non-pending jobs in the job pool (task 512). An unassigned non-pending job comprises an unassigned job that does not have a shared descriptor segment that corresponds to a shared descriptor segment for one of the assigned jobs that are available for sharing. It should be noted that when an unassigned non-pending job remains in the job pool for a long enough period of time, the job selection process 500 will eventually select the unassigned non-pending job once a processing unit changes its sharing status to unavailable after reaching the share limit (e.g., tasks 504, 506).

In response to identifying one or more unassigned non-pending jobs in the job pool, the job selection process 500 continues by selecting the oldest unassigned non-pending job from the job pool (task 514). As set forth above, after the appropriate job is selected, the job selection process 500 exits and the selected job is assigned to the available DECO 208 (e.g., task 312). Because the selected job is not a pending job, when the burst of job information for the selected job does not include all job information for the selected job, the additional job information for the selected job may not be obtained from one of the DECOs and instead must be obtained from memory (e.g., tasks 314, 318).

In an exemplary embodiment, when the job selection process 500 determines that there are no non-pending jobs in the job pool, the job selection process 500 continues by identifying and/or determining whether there are any unassigned parallel pending jobs in the job pool (task 516). An unassigned parallel pending job comprises an unassigned pending job having a shared descriptor segment (or shared descriptor pointer) that matches the shared descriptor segment (or shared descriptor pointer) of a job previously assigned to the a processing unit other than the available processing unit. In addition, the sharing criteria for the previously assigned job indicate that the shared descriptor segment is available for sharing and may be shared in parallel. In response to identifying one or more unassigned parallel pending jobs in the job pool, the job selection process 500 continues by selecting the oldest unassigned parallel pending job from the job pool (task 518). As set forth above, after the appropriate job is selected, the job selection process 500 exits and the selected job is assigned to the available DECO 208 (e.g., task 312). Because the selected job is a parallel pending job with a shared descriptor segment corresponding to the shared descriptor segment of another job assigned to one of the DECOs, the shared descriptor segment for the selected job may be obtained from the appropriate DECO in lieu of obtaining the shared descriptor segment from external memory. As set forth above, the job control module 204 notifies or otherwise provides the available DECO with the identity of the job buffer and/or DECO having the shared descriptor segment that matches the shared descriptor segment for the selected job (e.g., task 314). In this case, the shared descriptor segment for the selected job is obtained by copying the shared descriptor segment from the job buffer of the appropriate DECO and stored in the job buffer for the available DECO (e.g., task 316). In this manner, the shared descriptor information (e.g., the shared descriptors and shared descriptor header) is shared in parallel from a job assigned to another DECO to the selected job assigned to the available DECO.

In an exemplary embodiment, when the job selection process 500 determines that there are no unassigned parallel pending jobs in the job pool, the job selection process 500 does not select a job for the available processing unit (task 520). For example, when the unassigned jobs in the job pool comprise serial pending jobs for other DECOs, the job selection process 500 does not assign any unassigned serial pending jobs for other DECOs to the available DECO, because it is more efficient to share information serially among the other DECOs, rather assigning the job to the available DECO which would need to access memory to obtain the shared descriptor information (e.g., because it cannot be shared in parallel). This is because the other DECOs will not incur memory-related latencies and/or consume additional bandwidth on the system bus (e.g., bus 112) in order to obtain the shared descriptor information. In this situation, when no jobs are assigned to the DECO, the job selection process 500 may periodically repeat to determine if the sharing criteria for the assigned jobs has changed or when additional unassigned jobs are obtained from the job sources 202 for the job pool (e.g., tasks 306) until a job is selected for the available DECO (e.g., tasks 308, 310).

One advantage of the systems and/or methods described above is that the common job information (e.g., cryptographic keys, initializations, protocol information, metadata, or other common job information) for jobs offloaded to the hardware accelerator is shared across jobs within the hardware accelerator in lieu of redundantly obtaining the information from external memory for each individual job. For example, when processing a plurality of IPsec packets, the job information for the jobs corresponding to processing each packet may be shared serially by a DECO, such that common job information (e.g., cryptographic keys, authentication keys, sequence numbers, next header fields, security parameters index) may remain in the DECO to use when processing each packet. A DECO may process a first packet, and after completing processing of the first packet and indicating it is available, be assigned a job corresponding to processing a second packet that has job information for processing the second packet that corresponds to job information used for processing the first packet (e.g., cryptographic keys, authentication keys, sequence numbers, next header fields, security parameters index). The DECO may maintain the common job information for processing the second packet (e.g., cryptographic keys, authentication keys, sequence numbers, next header fields, security parameters index) in its job buffer and process the second packet based on the burst of job information provided by the job control module and the common job information maintained by the DECO from processing the first packet. As a result, the hardware accelerator performs fewer memory reads, in terms of both the number of read operations and the amount of data being read, which in turn reduces the system bus bandwidth consumed by the hardware accelerator. In addition, the latencies related to reading from external memory are reduced, thereby reducing the average amount of time required to complete the offloaded jobs. Also, because the shared descriptor segment may include common commands among jobs, it is possible to achieve additional performance improvements by not having to re-execute the common commands. For example, a command comprising fetching a key from external memory and decrypting it could be executed just once with the result shared across multiple jobs having the same shared descriptor segment, i.e., the command and key may be fetched only once and the cryptographic hardware used only once rather than fetching the command and key for each job and using the cryptographic hardware for each job.

Systems, devices, and methods configured in accordance with example embodiments of the subject matter relate to:

A method is provided for utilizing a plurality of processing units. In an exemplary embodiment, the method comprises selecting a pending job from a plurality of unassigned jobs based on a plurality of assigned jobs for the plurality of processing units and assigning the pending job to a first processing unit. Each assigned job is associated with a respective processing unit, wherein the pending job is associated with a first segment of information that corresponds to a second segment of information for a first assigned job. The method further comprises obtaining the second segment of information that corresponds to the first segment of information from the respective processing unit associated with the first assigned job, resulting in an obtained segment of information and performing, by the first processing unit, the pending job based at least in part on the obtained segment of information. In accordance with one embodiment, the plurality of unassigned jobs are maintained in a plurality of registers, with each register maintaining a burst of job information for a respective unassigned job of the plurality of unassigned jobs. The method further comprises selecting a first unassigned job of the plurality of assigned jobs, the first unassigned job being maintained in a first register of the plurality of registers, and providing, by the job control module, the burst of job information for the first unassigned job maintained the first register to the first processing unit. The method further comprises performing the first unassigned job based on the burst of information for the first unassigned job and the obtained segment of information. In accordance with one embodiment, the first assigned job corresponds to processing a first packet by the first processing unit and the first unassigned job corresponding to processing a second packet having a segment of job information for processing the second packet that corresponds to a segment of job information for processing the first packet. The method comprises obtaining the second segment of information by maintaining, by the first processing unit, the segment of job information for processing the first packet that corresponds to the segment of job information for processing the second packet, and performing, by the first processing unit, the pending job by processing the second packet based on the burst of job information for the first unassigned job and the segment of job information for processing the first packet maintained by the first processing unit.

In another embodiment, the first assigned job is associated with the first processing unit, wherein selecting the pending job from the plurality of unassigned jobs comprises identifying a serial pending job for the first processing unit from the plurality of unassigned jobs based on the first assigned job, and obtaining the second segment of information comprises maintaining, by the first processing unit, the second segment of information for the first assigned job that corresponds to the first segment of information in response to assigning the serial pending job. In a further embodiment, the method further comprises identifying a non-pending job from the plurality of unassigned jobs when no serial pending job exists among the plurality of unassigned jobs, assigning the non-pending job to the first processing unit, and obtaining information for the non-pending job from memory communicatively coupled to the plurality of processing units, wherein the first processing unit is configured to perform the non-pending job based on the information obtained from memory. In accordance with another embodiment, the first assigned job is associated with a second processing unit of the plurality of processing units, wherein selecting the pending job from the plurality of unassigned jobs comprises identifying a parallel pending job from the plurality of unassigned jobs based on the first assigned job, and obtaining the second segment of information comprises copying the second segment of information from the second processing unit to the first processing unit. In accordance with yet another embodiment, selecting the pending job from the plurality of unassigned jobs comprises determining a shared segment for a first unassigned job of the plurality of unassigned jobs matches the second segment of information for the first assigned job, and determining the second segment of information is available for sharing. In a further embodiment, the plurality of processing units are communicatively coupled to memory, wherein determining the shared segment for the first unassigned job matches the second segment of information for the first assigned job comprises determining a pointer for the shared segment of the first unassigned job in memory is equal to a pointer for the second segment of information for the first assigned job.

In accordance with another embodiment, a method is provided for obtaining information for a first processing unit of one or more processing units, wherein each processing unit of the one or more processing units is associated with a respective assigned job. The method comprises obtaining job information for a first assigned job from memory communicatively coupled to the one or more processing units, resulting in obtained job information for the first assigned job, selecting an unassigned job for the first processing unit, resulting in a selected job, and assigning the selected job to the first processing unit. The method further comprises obtaining a first segment of information for the selected job from a respective processing unit associated with the first assigned job when the first segment of information for the selected job corresponds to a subset of the obtained job information for the first assigned job, and performing, by the first processing unit, the selected job based at least in part on the first segment of information. In accordance with one embodiment, selecting the unassigned job comprises selecting a first unassigned job from a plurality of unassigned jobs maintained in a plurality of registers, each register of the plurality of registers maintaining a burst of job information for a respective unassigned job of the plurality of unassigned jobs, and assigning the selected job comprises providing the burst of job information for the first unassigned job to the first processing unit.

In accordance with one embodiment, selecting the first unassigned job comprises selecting a serial pending job for the first processing unit from the plurality of unassigned jobs. In a further embodiment, the first assigned job is associated with the first processing unit, wherein selecting the serial pending job comprises determining a shared descriptor segment for the first unassigned job matches a shared descriptor segment for the first assigned job, the subset of the obtained job information for the first assigned job comprising the shared descriptor segment for the first assigned job, and selecting the first unassigned job for the first processing unit when the shared descriptor segment for the first assigned job is available for sharing. In another embodiment, selecting the unassigned job comprises selecting a parallel pending job for the first processing unit from the plurality of unassigned jobs when no serial pending job exists among the plurality of unassigned jobs and no non-pending job exists among the plurality of unassigned jobs. In a further embodiment, the first assigned job is associated with a second processing unit of the one or more processing units, wherein selecting the unassigned job comprises determining a shared descriptor segment for the first unassigned job matches a shared descriptor segment for the first assigned job, the subset of the obtained job information for the first assigned job comprising the shared descriptor segment for the first assigned job, and selecting the first unassigned job for the first processing unit when the shared descriptor segment for the first assigned job is available for sharing in parallel. In a further embodiment, obtaining the first segment of information for the selected job comprises copying the shared descriptor segment for the first assigned job for the first assigned job from the second processing unit to the first processing unit.

In another embodiment, an apparatus for a data processing system is provided. The data processing system comprises an interface for coupling to a memory, a job source, and an acceleration architecture communicatively coupled to the job source and communicatively coupled to the memory via the interface. The acceleration architecture is configured to obtain a plurality of jobs from the job source, obtain job information for a first job of the plurality of jobs from the memory, resulting in obtained job information for the first job, perform the first job based on the obtained job information for the first job, and when a segment of information for a second job of the plurality of jobs corresponds to a subset of the obtained job information for the first job, perform the second job based at least in part on the subset of the obtained job information for the first job. In accordance with one embodiment, the acceleration architecture includes a plurality of processing units and a control module. The first job is assigned to a respective processing unit of the plurality of processing units, the respective processing unit associated with the first job being configured to obtain job information for the first job from the memory. The control module is configured to identify a first processing unit of the plurality of processing units as being available, and assign the second job to the first processing unit, wherein the first processing unit is configured to obtain the subset of the obtained job information for the first job corresponding to the segment of information for the second job from the respective processing unit associated with the first job. In a further embodiment, the first processing unit is configured to maintain the subset of the obtained job information for the first job when the first job is assigned to the first processing unit, and copy the subset of the obtained job information for the first job from a second processing unit of the plurality of processing units to the first processing unit when the first job is assigned to the second processing unit. In accordance with one embodiment, the acceleration architecture includes a plurality of registers, with each register being configured to maintain a burst of job information for a respective job of the plurality of jobs obtained from the job source and a burst of job information for the second job is maintained in a first register of the plurality of registers. The control module is configured to assign the second job to the first processing unit by providing the burst of job information for the second job from the first register to the first processing unit. In yet another embodiment, the first processing unit is configured to perform the second job based on the burst of job information for the second job and the subset of the obtained job information for the first job.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for utilizing a plurality of processing units, the method comprising:
   obtaining, by a first processing unit of the plurality of processing units, a first shared descriptor segment of first job information for a first job assigned to the first processing unit from a memory communicatively coupled to the plurality of processing units via an interface;
   obtaining, by a job control module, a subset of second job information for a second job;
   selecting, by the job control module, the second job from a plurality of unassigned jobs to be assigned to a second processing unit of the plurality of processing units by identifying the second job as a parallel pending job when a second shared descriptor segment of the second job information matches the first shared descriptor segment for the first job and sharing criteria for the first job indicates that the first shared descriptor segment is available for sharing in parallel;
   providing, by the job control module, the subset of second job information to the second processing unit;
   obtaining, by the second processing unit, the first shared descriptor segment from the first processing unit assigned the first assigned job by copying the first shared descriptor segment from the first processing unit to the second processing unit, resulting in an obtained segment of information; and
   performing, by the second processing unit, the second job based at least in part on the subset of second job information and the obtained segment of information.

2. The method of claim 1, the plurality of unassigned jobs being maintained in a plurality of registers, each register maintaining a burst of job information for a respective unassigned job of the plurality of unassigned jobs, wherein:
   selecting the second job comprises selecting a first unassigned job of the plurality of unassigned jobs when the burst of job information for the first unassigned job indicates the second shared descriptor segment matches first shared descriptor segment, the burst of job information for the first unassigned job being maintained in a first register of the plurality of registers and comprising the subset of second job information;
   providing the subset of second job information comprises providing, by the job control module, the burst of job information for the first unassigned job maintained the first register to the second processing unit; and
   performing the second job comprises performing the first unassigned job based on the burst of information for the first unassigned job and the obtained segment of information.

3. The method of claim 1, wherein selecting the second job from the plurality of unassigned jobs comprises:
   determining the second shared descriptor segment is available for sharing.

4. The method of claim 1, wherein selecting the second job from the plurality of unassigned jobs comprises determining a pointer for the second shared descriptor segment of the second job in memory is equal to a pointer for the first shared descriptor segment for the first job.

5. The method of claim 1, wherein:
   the first shared descriptor segment of first job information for the first job comprises a cryptographic key, an authentication key, a sequence number, a next header field, or a security parameters index for processing a first packet; and
   the second shared descriptor segment of second job information for the second job comprises the cryptographic key, the authentication key, the sequence number, the next header field, or the security parameters index for processing a second packet.

6. The method of claim 1, further comprising obtaining, by the first processing unit, additional second job information for the second job from the memory, wherein performing the second job comprises performing the second job based on the subset of second job information, the obtained segment of information, and the additional second job information.

7. A method of obtaining information for a first processing unit of one or more processing units, each processing unit of the one or more processing units being associated with a respective assigned job, the method comprising:
   obtaining job information for a first assigned job from memory communicatively coupled to the one or more processing units, resulting in obtained job information for the first assigned job;
   obtaining a burst of second job information for a second job;
   selecting the second job to be assigned to the first processing unit when the burst of second job information indicates a first segment of the second job information in memory matches a subset of the obtained job information for the first assigned job, wherein selecting the second job comprises selecting a first unassigned job from a plurality of unassigned jobs maintained in a plurality of registers, each register maintaining a respective burst of job information for a respective unassigned job of the plurality of unassigned jobs;
   assigning the second job to the first processing unit by providing the burst of second job information for the first unassigned job from a first register of the plurality of registers to the first processing unit;

obtaining the subset of the obtained job information for the first assigned job from a respective processing unit associated with the first assigned job; and performing, by the first processing unit, the second job based at least in part on the subset of the obtained job information for the first assigned job and the burst of second job information.

8. The method of claim 7, wherein selecting the first unassigned job comprises selecting a serial pending job for the first processing unit from the plurality of unassigned jobs.

9. The method of claim 8, the first assigned job being associated with the first processing unit, wherein selecting the serial pending job comprises:

determining a shared descriptor segment for the first unassigned job matches a shared descriptor segment for the first assigned job, the subset of the obtained job information for the first assigned job comprising the shared descriptor segment for the first assigned job; and selecting the first unassigned job for the first processing unit when the shared descriptor segment for the first assigned job is available for sharing.

10. The method of claim 7, wherein selecting the first unassigned job comprises selecting a parallel pending job for the first processing unit from the plurality of unassigned jobs when no serial pending job exists among the plurality of unassigned jobs and no non-pending job exists among the plurality of unassigned jobs.

11. The method of claim 7, wherein obtaining the subset of the obtained job information for the first assigned job comprises copying the shared descriptor segment for the first assigned job from a second processing unit of the one or more processing units to the first processing unit.

12. A system comprising:
an interface for coupling to a memory;
a job source; and
an acceleration architecture communicatively coupled to the job source and communicatively coupled to the memory via the interface
obtain a plurality of jobs from the job source,
obtain job information for a first job of the plurality of jobs from the memory, resulting in obtained job information for the first job,
perform the first job based on the obtained job information for the first job,
obtain a burst of second job information for a second job of the plurality of jobs from the job source or the memory, and
when a segment of the second job information corresponds to a subset of the obtained job information for the first job, perform the second job based at least in part on the subset of the obtained job information for the first job and the burst of the second job information, wherein the acceleration architecture includes:
a plurality of processing units, the first job being assigned to a respective processing unit of the plurality of processing units, the respective processing unit associated with the first job being configured to obtain job information for the first job from the memory; and
a control module coupled to the plurality of processing units, the control module being configured to:
identify a first processing unit of the plurality of processing units as being available; and
assign the second job to the first processing unit, wherein the first processing unit is configured to obtain the subset of the obtained job information for the first job corresponding to the segment of information for the second job from the respective processing unit associated with the first job.

13. The system of claim 12, wherein the acceleration architecture includes a plurality of registers, each register being configured to maintain a respective burst of job information for a respective job of the plurality of jobs obtained from the job source, wherein:

the burst of the second job information is maintained in a first register of the plurality of registers;

the control module is configured to assign the second job to the first processing unit by providing the burst of the second job information from the first register to the first processing unit; and the first processing unit is configured to perform the second job based on the burst of the second job information and the subset of the obtained job information for the first job.

14. The system of claim 12, wherein:
when the first job is assigned to the first processing unit, the first processing unit is configured to maintain the subset of the obtained job information for the first job in its job buffer; and when the first job is assigned to a second processing unit of the plurality of processing units, the first processing unit is configured to copy the subset of the obtained job information for the first job from the second processing unit to its job buffer.

15. The system of claim 12, wherein the interface comprises a parallel bus interface.

16. A method for utilizing a plurality of processing units, the method comprising:

obtaining, by a first processing unit of the plurality of processing units, a first shared descriptor segment of first job information for a first job assigned to the first processing unit from a memory communicatively coupled to the plurality of processing units via an interface;

obtaining, by a job control module, a subset of second job information for a second job;

selecting, by the job control module, the second job from a plurality of unassigned jobs to be assigned to a second processing unit of the plurality of processing units based on a second shared descriptor segment of the second job information, the plurality of unassigned jobs being maintained in a plurality of registers, each register maintaining a burst of job information for a respective unassigned job of the plurality of unassigned jobs, wherein selecting the second job comprises selecting a first unassigned job of the plurality of unassigned jobs when the burst of job information for the first unassigned job indicates the second shared descriptor segment matches first shared descriptor segment, the burst of job information for the first unassigned job being maintained in a first register of the plurality of registers and comprising the subset of second job information;

providing, by the job control module, the burst of job information for the first unassigned job maintained the first register to the second processing unit;

obtaining, by the second processing unit, the first shared descriptor segment from the first processing unit assigned the first assigned job, resulting in an obtained segment of information; and performing, by the second processing unit, the second job based on the burst of information for the first unassigned job and the obtained segment of information.

17. The method of claim 16, wherein:
the first job corresponds to processing a first packet;

the first unassigned job corresponds to processing a second packet having a segment of job information for processing the second packet that corresponds to a segment of job information for processing the first packet; and performing, by the second processing unit, the second job comprises processing the second packet based on the burst of job information for the first unassigned job and the segment of job information for processing the first packet maintained by the first processing unit.

18. The method of claim 16, wherein:

selecting the second job from the plurality of unassigned jobs comprises identifying the second job as a parallel pending job from the plurality of unassigned jobs when the second shared descriptor segment of the second job information matches the first shared descriptor segment and sharing criteria for the first job indicates that the first shared descriptor segment is available for sharing in parallel; and obtaining the first shared descriptor segment comprises copying the first shared descriptor segment from the first processing unit to the second processing unit.

19. The method of claim 16, wherein selecting the second job from the plurality of unassigned jobs comprises determining a pointer for the second shared descriptor segment of the second job in memory is equal to a pointer for the first shared descriptor segment for the first job.

20. The method of claim 19, wherein:

selecting the second job from the plurality of unassigned jobs comprises identifying the second job as a parallel pending job from the plurality of unassigned jobs when the pointer for the second shared descriptor segment of the second job in memory is equal to the pointer for the first shared descriptor segment for the first job and sharing criteria for the first job indicates that the first shared descriptor segment is available for sharing in parallel; and obtaining the first shared descriptor segment comprises copying the first shared descriptor segment from the first processing unit to the second processing unit.

21. A method for utilizing a plurality of processing units, the method comprising:

obtaining, by a first processing unit of the plurality of processing units, a first shared descriptor segment of first job information for a first job assigned to the first processing unit from a memory communicatively coupled to the plurality of processing units via an interface;

obtaining, by a job control module, a subset of second job information for a second job;

selecting, by the job control module, the second job from a plurality of unassigned jobs to be assigned to a second processing unit of the plurality of processing units based on a pointer for a second shared descriptor segment of the second job in memory being equal to a pointer for the first shared descriptor segment for the first job;

providing, by the job control module, the subset of second job information to the second processing unit;

obtaining, by the second processing unit, the first shared descriptor segment from the first processing unit assigned the first assigned job, resulting in an obtained segment of information; and performing, by the second processing unit, the second job based at least in part on the subset of second job information and the obtained segment of information.

* * * * *